United States Patent
Nadeau et al.

(10) Patent No.: US 11,755,664 B2
(45) Date of Patent: *Sep. 12, 2023

(54) ELECTRONIC EVIDENCE TRANSFER

(71) Applicant: GENETEC INC., St-Laurent (CA)

(72) Inventors: Mathieu Nadeau, Montreal (CA); Francis Michaud, Varennes (CA); Pierre-Olivier Veilleux, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/477,956

(22) Filed: Sep. 17, 2021

(65) Prior Publication Data
US 2022/0004588 A1    Jan. 6, 2022

Related U.S. Application Data

(63) Continuation of application No. 16/165,791, filed on Oct. 19, 2018, now Pat. No. 11,151,204.

(60) Provisional application No. 62/680,574, filed on Jun. 4, 2018.

(51) Int. Cl.
| | |
|---|---|
| *G06F 16/951* | (2019.01) |
| *H04L 9/08* | (2006.01) |
| *H04L 9/40* | (2022.01) |
| *G06Q 10/10* | (2023.01) |

(Continued)

(52) U.S. Cl.
CPC ........ *G06F 16/951* (2019.01); *G06F 16/9566* (2019.01); *G06Q 10/10* (2013.01); *H04L 9/0825* (2013.01); *H04L 63/045* (2013.01); *H04L 63/0442* (2013.01); *H04L 63/166* (2013.01); *G06Q 50/26* (2013.01)

(58) Field of Classification Search
CPC ... G06F 16/951; G06F 16/9566; G06Q 10/10; G06Q 50/26; H04L 9/0825; H04L 9/0894; H04L 63/0442; H04L 63/045; H04L 63/166; H04L 63/0272; H04L 63/30; H04L 2209/80

See application file for complete search history.

(56) References Cited

U.S. PATENT DOCUMENTS

| | | |
|---|---|---|
| 6,560,626 B1 | 5/2003 | Hogle et al. |
| 6,670,969 B1 | 12/2003 | Halstead, Jr. et al. |
| 7,451,305 B1 | 11/2008 | Pritikin |

(Continued)

FOREIGN PATENT DOCUMENTS

| | | |
|---|---|---|
| WO | 2017/083980 A1 | 5/2017 |
| WO | 2017/083985 A1 | 5/2017 |

OTHER PUBLICATIONS

Related International patent application No. PCT/CA2019/050773 International Preliminary Report on Patentability Chapter I dated Dec. 8, 2020.

(Continued)

*Primary Examiner* — Han Yang

(57) ABSTRACT

A method for transferring electronic evidence is provided. The law enforcement agencies can make efficient use of social media and other forms of public communications to make a public appeal for information on crimes and other investigations wherein the public appeals allow members of the public to easily submit information and/or media files from smartphones and other computers in a way that allows the submission to be linked to the public appeal (e.g. the specific case file or the attributes of the case file) so that the submission data can be found and accessed by law enforcement investigators.

23 Claims, 7 Drawing Sheets

(51) Int. Cl.
*G06F 16/955* (2019.01)
*G06Q 50/26* (2012.01)

(56) References Cited

U.S. PATENT DOCUMENTS

| | | | |
|---|---|---|---|
| 9,483,732 | B1 | 11/2016 | Milakovich |
| 9,854,015 | B2 | 12/2017 | Brewer et al. |
| 9,959,505 | B1* | 5/2018 | Milakovich ............ G06N 5/02 |
| 10,699,021 | B2 | 6/2020 | De Oliveira et al. |
| 11,055,366 | B2* | 7/2021 | Nadeau ................ H04L 63/166 |
| 2003/0115167 | A1 | 6/2003 | Sharif et al. |
| 2006/0041938 | A1 | 2/2006 | Ali |
| 2008/0109823 | A1 | 5/2008 | Whitfield et al. |
| 2009/0161869 | A1* | 6/2009 | Chow ............ H04N 21/26613 380/259 |
| 2009/0208004 | A1 | 8/2009 | Kawai et al. |
| 2011/0018998 | A1 | 1/2011 | Guzik |
| 2013/0238882 | A1 | 9/2013 | Suzuki et al. |
| 2015/0326618 | A1* | 11/2015 | Lim ..................... G06F 21/64 726/27 |
| 2015/0381667 | A1* | 12/2015 | Brewer ................ H04L 67/535 709/204 |
| 2017/0055138 | A1* | 2/2017 | McDonnell .......... H04W 4/021 |
| 2019/0161869 | A1 | 5/2019 | Bisselink |
| 2019/0370400 | A1 | 12/2019 | Nadeau et al. |
| 2019/0372946 | A1 | 12/2019 | Nadeau et al. |
| 2021/0133904 | A1 | 5/2021 | Saliba et al. |
| 2021/0158047 | A1 | 5/2021 | Tanner et al. |

OTHER PUBLICATIONS

Related International patent application No. PCT/CA2019/050773 International Search Report dated Sep. 30, 2019.
Related International patent application No. PCT/CA2019/050773 Written Opinion dated Sep. 30, 2019.
Related U.S. Appl. No. 16/042,209 Office Action dated Aug. 11, 2020.
Related U.S. Appl. No. 16/042,209 Office Action dated Nov. 30, 2020.
Related U.S. Appl. No. 17/334,920 Office Action dated Sep. 30, 2022.

* cited by examiner

X is inviting you to share files for the following incident
This invitation ends in 7 days

Hit and run in the parking lot

◉ Location                    🕐 Incident date and time

Hide map

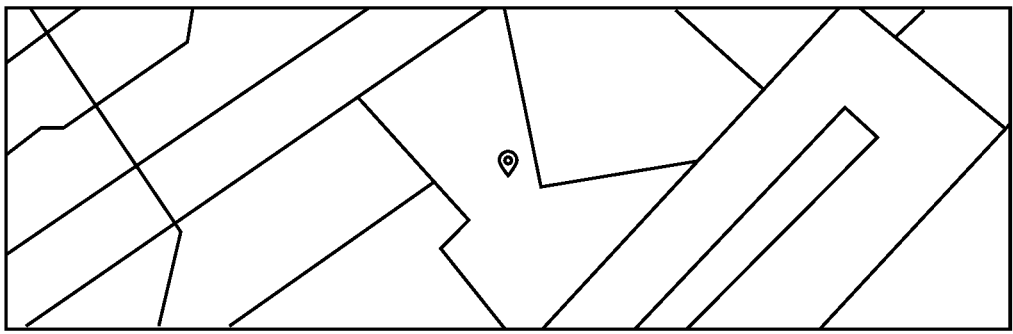

There was a hit and run in the parking lot last night. We are trying to locate all possible evidences of the incident

You must identify yourself before sharing files

First name                    Last name
_____             _____ email                         Phone number (optional)
_____             _____

You must read and accept the following terms

By sending us the file you agree that your identity could be disclosed in court.

☐ I have read and accept the terms above (Share files)

Figure 7A

ELECTRONIC EVIDENCE TRANSFER

This application is a continuation of U.S. patent application Ser. No. 16/165,791 filed Oct. 19, 2018, which is a nonprovisional of U.S. provisional patent application 62/680,574 filed Jun. 4, 2018, the contents of which are hereby incorporated by reference. This application is related to U.S. Pat. No. 11,055,366 issued Jul. 6, 2021.

TECHNICAL FIELD

The present patent application relates to the field of data communications and more particularly to electronic evidence transfer that can facilitate management of chain of custody The present patent application also relates to communications systems used by law enforcement to communicate with the public.

BACKGROUND

Law enforcement regularly turns to the public for information regarding investigations. Some examples are missing persons, hit and runs, robberies, arson fires, property damage, and shootings. Police can make appeals to the public in the media, namely radio, television and the web. The rise in use of smartphones and dashboard cameras has increased the ability of the public to provide media files to law enforcement that are related to investigations or crimes.

Chain of custody can be understood to refer to the chronological documentation or paper trail that records the sequence of custody, control, transfer, analysis, and disposition of physical or electronic evidence. In the case of electronic evidence, a person having control or oversight of an electronic device or system that is used to collect electronic evidence, such as a camera, transfers one or more data files related to the electronic evidence to secure storage. That person must be able to attest to the authenticity of data files from the moment of collection until the moment of transfer to the secure storage.

Whenever a data file is made available for editing, its authenticity can be challenged. It is important in the case of electronic evidence to ensure that the chain of custody reduces the risk of any evidence tampering.

Evidence can be obtained from a variety of sources including citizens who have recorded photos and videos of events. For such citizens, the transfer of their data files from smartphones and other devices to authorities can involve steps that increase the risk that the data files are available for tampering and can complicate the reliability of such evidence.

SUMMARY

The present disclosure provides, inter alia, novel and innovative solutions for the above-mentioned needs in the art which will become apparent to those skilled in the art once given this disclosure.

Applicant has discovered that law enforcement agencies can make efficient use of social media and other forms of public communications to make a public appeal for information on crimes and other investigations wherein the public appeals allow members of the public to easily submit information and/or media files from smartphones and other computers in a way that allows the submission to be linked to the public appeal (e.g. the specific case file or the attributes of the case file) so that the submission data can be found and accessed by law enforcement investigators.

Applicant has discovered that properly managed encryption of media recorded in the memory of a media recording device or a device, such as a camera, where the device is structured to prevent access to the media without the media being securely encrypted, allows for the media to be transferred from the device to secure storage, for example secure storage controlled by law enforcement agencies, without exposing the media to possible tampering so that the management of the chain of custody of the media is simplified.

Applicant has also discovered that a computer browser can be used to perform secure encryption of media files from a computer storing a source electronic evidence media file without needing to install on the computer any additional computer program or app for the purposes of transferring evidence files. Media files can comprise e-mails, photos, videos, audio recordings, documents, copies of websites, etc.

To manage encryption of media properly, Applicant proposes in some embodiments to use encryption of the type disclosed in its co-pending patent application Ser. No. 15/776,448 filed on May 16, 2018 that is the national stage of PCT application number PCT/CA2016/051350, published on May 26, 2017 as WO2017/083980, the contents of which are incorporated herein by reference. Management of access control and encryption of media streams is also disclosed in Applicant's co-pending patent application Ser. No. 15/776,436 filed on May 16, 2018 that is the national stage of PCT application number PCT/CA2016/051358, published on May 26, 2017 as WO2017/083985, the contents of which are incorporated herein by reference. The encryption disclosed allows the device to create file encryption keys, e.g. using a pseudo-random number generator, that can be changed over time to encrypt media and to transmit to a storage server the encrypted media. Meanwhile, the file encryption keys are encrypted using the public key of an entity that will provide access to authorized personnel of the media files. This entity can use its private key to decrypt the file encryption keys and use them appropriately so that the authorized personnel can have access to the media.

BRIEF DESCRIPTION OF THE DRAWINGS

The invention will be better understood by way of the following detailed description of embodiments of the invention with reference to the appended drawings, in which:

FIG. 7A is a screen image of a user interface provided in a browser showing a display of the public appeal identification, a file upload selector, a map of the location of the area of interest to the investigation, a comment text box and a citizen identification text box.

DETAILED DESCRIPTION

Figure 1:
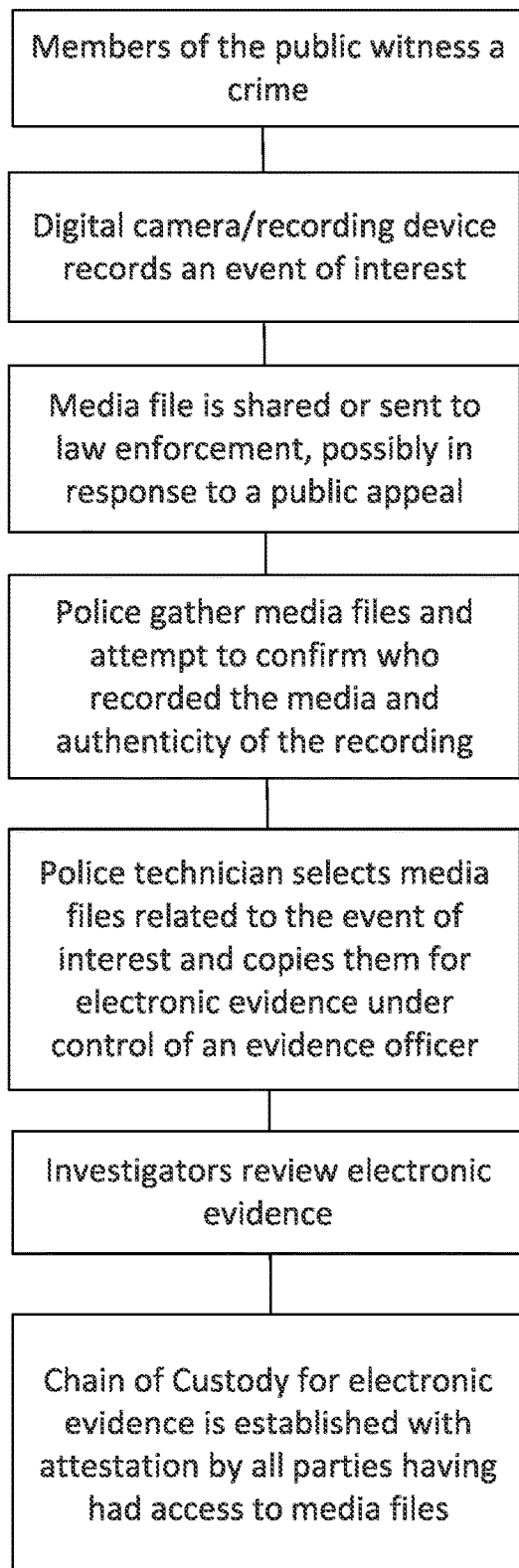
FIG. 1 is a flow chart representing steps involved in electronic evidence collection according to the prior art.

The Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

In one aspect, the present invention provides a method for properly managing the encryption of media recorded in the memory of a media recording device or a device, such as a camera, where the device is structured to prevent access to the media without the media being securely encrypted, allows for the media to be transferred from the device to secure storage, for example secure storage controlled by law enforcement agencies, without exposing the media to possible tampering so that the management of the chain of custody of the media is simplified.

In another aspect, the present disclosure provides a computer browser that can be used to perform secure encryption of media files from a computer storing a source electronic evidence media file without needing to install on the computer any additional computer program or app for the purposes of transferring evidence files. Media files can comprise e-mails, photos, videos, audio recordings, documents, copies of websites, etc.

In a different aspect the invention provides a method for transferring electronic evidence from a source computing device through a web browser or an evidence transfer app and storing a source evidence data file over a data network to evidence data storage. The method as further described herein comprises of either downloading at the browser web content from a uniform resource locator (URL) and having the web content processed by said web browser to perform the following: allowing a user to select a source evidence data file from storage of the source computing device, encrypting said source evidence data file using a file encryption key; and transmitting over said data network said encrypted source evidence data file from the source computing device to said evidence data storage. Alternatively, the evidence transfer app can be installed and executed to perform the above-mentioned tasks. The method may further comprise an electronic media appeal to the public for information and evidence may be efficiently managed by sending on social media, e-mail and/or websites. As mentioned above, the public appeal may be used in the browser for the appeal or as a program or app to respond to the appeal. In this way, a citizen using the browser or app can upload media files from the computer or smartphone they are using with secure encryption to the party making the public appeal. While this platform is of particular advantage in the context of appeals to the public by law enforcement agencies, it can be used in other contexts in which secure submissions of media files are needed by one party from any group that can be appealed to electronically.

The source evidence data file may be any type of evidence as desired such as an electronic message an image file a video file and an audio recording file.

Although any kind of encryption technique may be used to implement the disclosed, to manage encryption of media properly, the Applicant proposes to use encryption of the type disclosed in its co-pending patent application Ser. No. 15/776,448 filed on May 16, 2018 that is the national stage of PCT application number PCT/CA2016/051350, published on May 26, 2017 as WO2017/083980, the contents of which are incorporated herein by reference. Management of access control and encryption of media streams is also disclosed in Applicant's co-pending patent application Ser. No. 15/776,436 filed on May 16, 2018 that is the national stage of PCT application number PCT/CA2016/051358, published on May 26, 2017 as WO2017/083985, the contents of which are incorporated herein by reference. The encryption disclosed allows the device to create file encryption keys that can be changed over time to encrypt media and to transmit to a storage server the encrypted media. Such file encryption keys can be generated, rather than come from a key storage that may be vulnerable to external access, using pseudo-random or other methods, and destroyed after use. Meanwhile, the file encryption keys are encrypted using the public key of an entity that will provide access to authorized personnel of the media files. This entity can use its private key to decrypt the file encryption keys and use them appropriately so that the authorized personnel can have access to the media.

In some embodiments, the web browser or the evidence transfer app (hereinafter, the "app") may further use an asymmetric public encryption key of a chain-of-custody server associated with the evidence data storage to encrypt the file encryption key used to encrypt the source evidence data file using an asymmetric public encryption key and transmit the asymmetrically encrypted file encryption key over the data network to the chain-of-custody server associated with the evidence data storage.

In some embodiments, the present invention may use Transport Layer Security (TLS) or Secure Sockets Layer or (SSL) independently or in combination with other encryption techniques for the browser to establishes a connection between the source computing device and an evidence acceptance server. The browser may send the file encryption key used to encrypt the source evidence data file to the evidence acceptance server over the TLS or SSL connection. The evidence acceptance server may perform the asymmetric encryption using the public encryption key and return the encrypted file encryption key to the browser to subsequently be transmitted to the evidence data storage with the encrypted source evidence data file.

Alternatively, in one embodiment the communication between the source computing device and the evidence data storage is done only using TLS compliant cryptographic protocol.

It will be appreciated by those skilled in the art that the file encryption keys may be generated randomly by the source computing device or received from an external source. In later case, the transmission has to be preferably encrypted asymmetrically so only the source computing device can be decrypted the file encryption keys or be done using TLS compliant cryptographic protocol.

In one embodiment, the file encryption key may be deleted from the source computing device after use.

In some embodiments, metadata concerning the source evidence data file is transmitted from the source computing device to the evidence data storage. The metadata may be encrypted using the file encryption key and/or contain identification data of a user associated with the source computing device such as the user IP or any other desired information that can be provided or acquired using available techniques in the art.

It will be appreciated by those skilled in the art that the encryption of the evidence data file can be done using any encryption techniques such Advanced Encryption Standard (AES) 256-bit encryption.

In one aspect, the present invention may further provide the ability for the law enforcement to send out the URL to the public or a user to solicit the source evidence data file. In one embodiment the URL is broadcasted by different telecommunications networks to a target audience. The URL may be specific to the target audience and identifying a specific matter for which an appeal is made for evidence. In one embodiment, when the encrypted source evidence data file is provided by the target audience from the source computing device, the file has specific identification of said specific matter and the target audience. This way the invention provides the law enforcement forces with ability to easier manage the evidence and the information gather. For example, when someone contacts the call center or an officer, the call center or the officer may provide a URL which has the details of that person, information regarding the call or even the person who has to notified upon receipt of the encrypted source evidence data file.

In an alternative embodiment working with the app, this can be achieved by sending the user of the app ID to solicit from said user the source evidence data file. This could be done through broadcasting an app ID by way of telecommunications networks to the target audience of the app. The app ID may be specific to the target audience and identifying a specific matter for which an appeal is made for evidence. In one embodiment, when the encrypted source evidence data file is provided by the target audience from the source computing device, the file has specific identification of said specific matter and the target audience. For example, when someone contacts the call center or an officer, the call center or the officer may provide an app ID which has the details of that person, information regarding the call or even the person who has to notified upon receipt of the encrypted source evidence data file.

In one embodiment, the URL link may a matrix barcode shared on the media or used by a police officer to direct the evidence management system.

Referring to FIG. 1 illustrating a flowchart of the steps involved in electronic evidence collection according to the prior art. Members of the public witness a crime and use a digital camera/recording device to record an event of interest. The media file is shared or sent to law enforcement, possibly in response to a public appeal. The police gather media files and attempt to confirm who recorded the media and authenticity of the recording—Police technician selects media files related to the event of interest and copies them for electronic evidence under control of an evidence officer. Then, the investigators review electronic evidence. The Chain of Custody for electronic evidence is established with attestation by all parties having had access to media files which can be a very complicated process.

While reference is made herein to the police or to a law enforcement agency, it will be appreciated that by "law enforcement agency", it is meant any party undertaking an investigation that can rely on contributions from others, such as any level of law enforcement, e.g. municipal police, state police, federal police, border police, coast guard, military police, etc., private security firms, corporate security, campus security, and the like.

Figure 2:
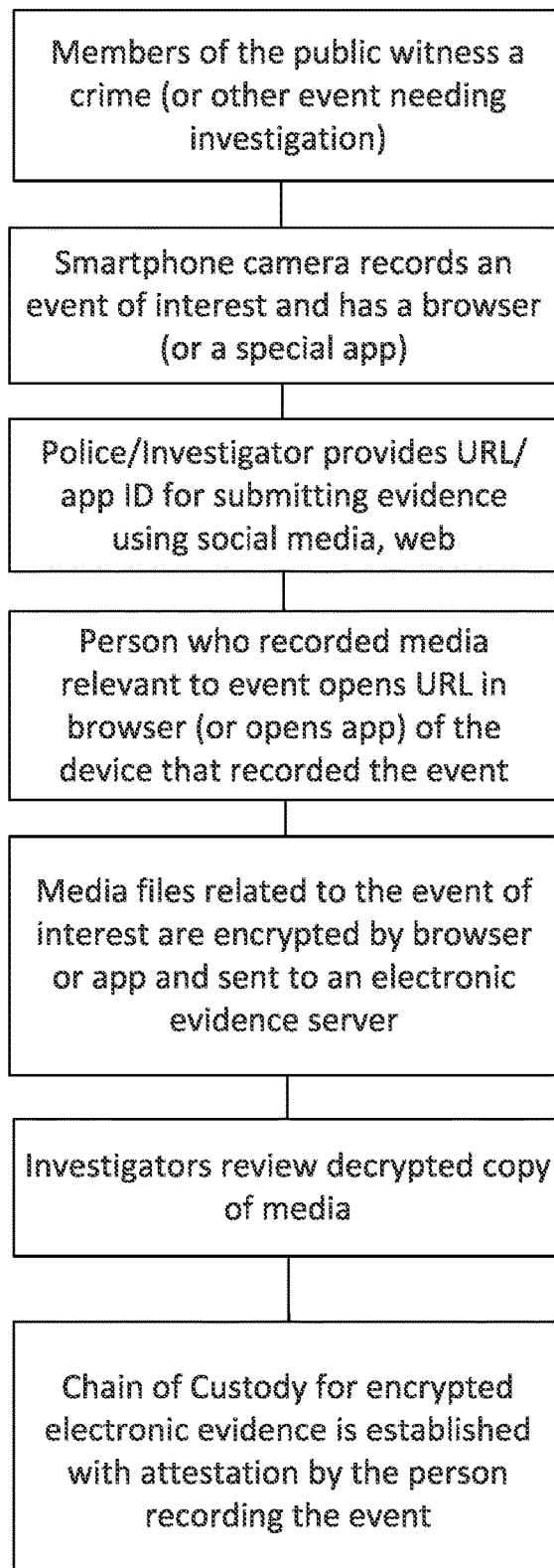
FIG. 2 is a flow chart representing steps involved in electronic evidence collection according to one embodiment.

FIG. 2 shows a flow chart of the steps involved in electronic evidence collection according to one embodiment of the present invention. Members of the public witness a crime or any other event which may require investigation. A smartphone or any other device that has a browse or a special app (hereinafter the "smartphone") records an event of interest. The Police, investigators or call center provide a URL or an app ID for submitting evidence—Person who recorded media relevant to event. That person opens the URL in the browser the device that recorded the event or opens the app of the device and the media files related to the event of interest are encrypted by browser or app and sent to an electronic evidence server subsequently, the investigators review decrypted copy of media. The Chain of Custody for encrypted electronic evidence can be easily established with attestation by the person recording the event.

Figure 3:
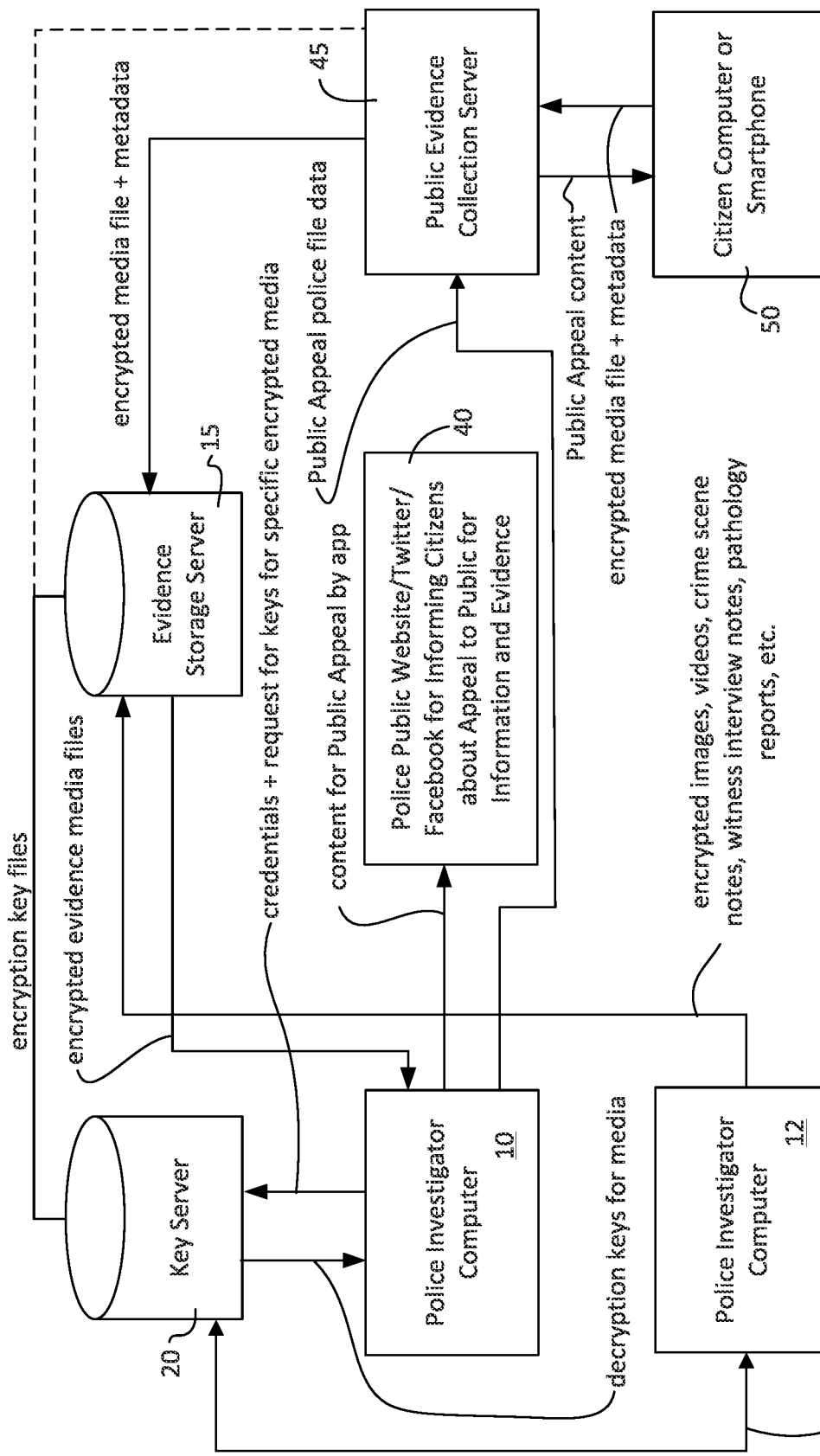
FIG. 3 is a schematic block diagram of an electronic evidence collection and handling system according to one embodiment having evidence acceptance capabilities to receive evidence following a public appeal for evidence in which a browser is used to encrypt evidence media files at a computer or device where the source media file is stored.
Figure 4:
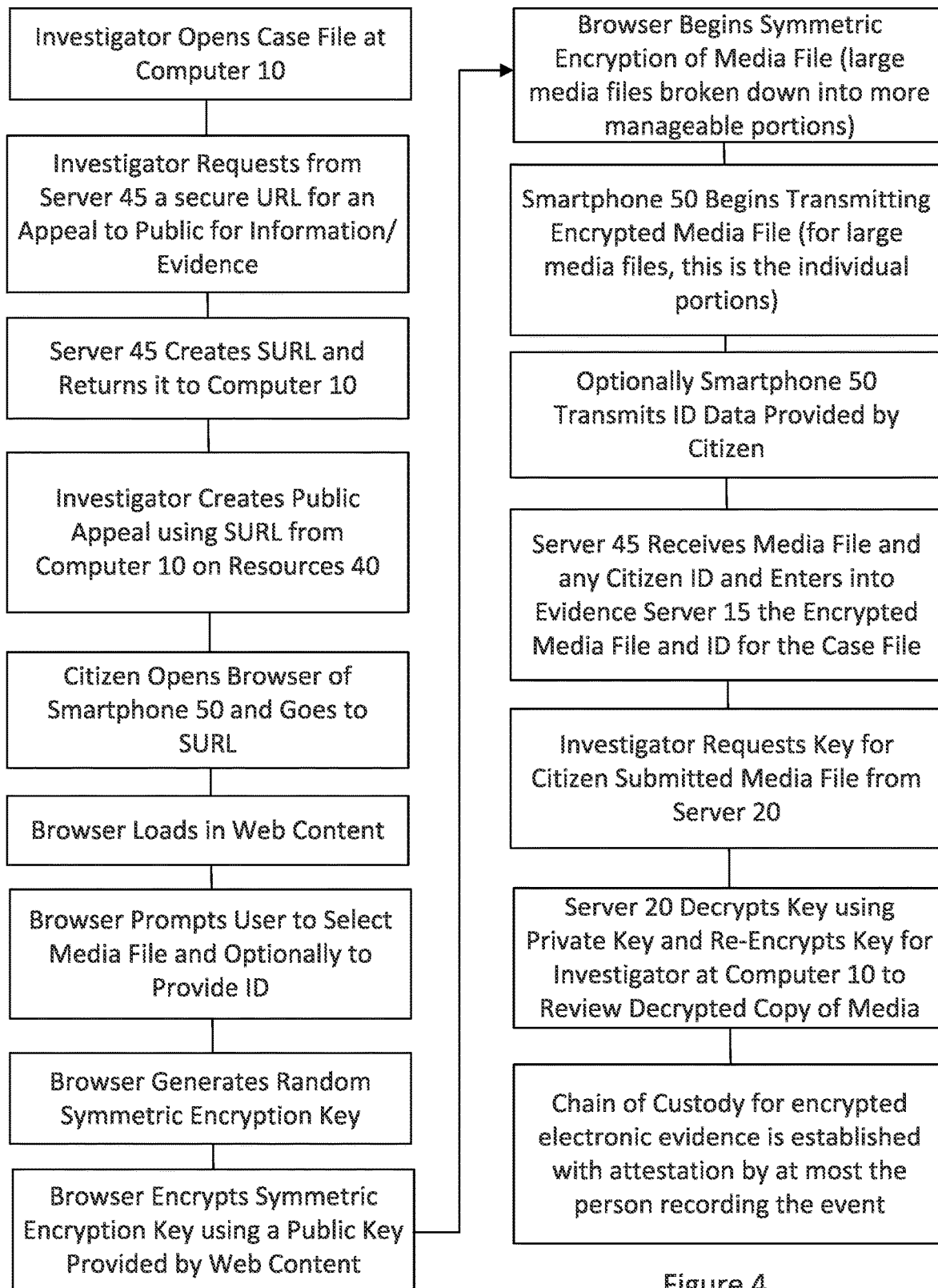
FIG. 4 is a flow diagram of steps involved in electronic evidence collection with reference to the system of FIG. 3.

FIGS. 3 and 4 illustrate respectively a schematic block diagram and a flowchart of an electronic evidence collection and handling system according to one embodiment having evidence acceptance capabilities to receive evidence following a public appeal for evidence in which a browser is used to encrypt evidence media files at a computer or device where the source media file is stored. As illustrated, a police investigator computer 10 requests from a public evidence collection server 45 to create a public appeal. The server 45 can create a secure URL ("SURL") (or a non-secure URL) for an appeal to public for information and evidence or it can create an entry in a menu or list of public appeals for the public appeal being created, whether the menu or list is to be seen in a webpage or in an app (hereinafter, the "public appeal"). The server 45 can create a public appeal SURL and return it to the police investigator computer 10. The investigator computer 10 creates the public appeal on resources 40 (police public website, twitter, Facebook, etc) and provides in the information provided by resources 40 a link to the SURL or to a location where the public can access the app. When a citizen opens the browser of their smartphone or computer 50 and go to the SURL, their browser loads the web content and prompts the user to select a media file and to optionally provide their ID or other information. Alternatively, the user can open an app associated with the server 45. The public appeal can be identified in the SURL or it can be selected by the citizen from a menu or list in the browser or app.

When the investigator creates a public appeal, he or she can specify directly the case number of the investigation or alternatively parameters or characteristics of the investigation that can be used to identify the appeal. This information can be considered to make up a "profile". As an example, the profile can identify merely a main characteristic of the incident related to the investigation, such "shots fired", "robbery", "abduction", "hit and run", etc., along with, for example, the incident location.

It will be appreciated that a number of public appeals can relate to the same incident so as to canvas different kinds of information or information from different groups of members of the public.

A photograph of the crime scene or of a suspect can also be provided to server 45 so that such information can be provided to the computer 50 for the public to see. Such information can help the public in providing helpful information.

While law enforcement may require the identification of the citizen submitting the evidence so as to have an attestation regarding the evidence, some citizens are reluctant to provide identification and law enforcement can still benefit from having information from the public even with a lack of identification of the citizen providing the evidence, since such information can be useful to an investigation. It will also be appreciated that the interface provided to the citizen can allow the citizen to provide a report of information, such as eye-witness accounts, relevant to the investigation that can be helpful to investigators. An information form template can be provided as part of the interface for this purpose. In some cases, such information can be sent to the server 45 from device 50 even without sending a media file. The citizen-provided information will be stored in the evidence storage server 15 in association with the police file for investigators to review and consider during the course of their investigation.

The browser can generate one or more file encryption keys and encrypt such file encryption keys using a public key provided by the web content or obtained from an external source. Subsequently, the browser begins file encryption of media file. If a file is too large, it will be broken down into more manageable portions or blocks. The smartphone 50 the begins transmitting encrypted media file(s) and, optionally, the ID data provided by the citizen. Next, the server 45 receives the media file and any citizen ID and enters into the evidence server 15 the encrypted media file and the ID for the case file. When an investigator requests to access electronic evidence from server 15, this can be done in a variety of ways. In one option, the investigator computer 10 is provided with the encrypted media and the decryption key. The decryption key can be provided from a separate secure channel, or the decryption key can be encrypted using a public key of the investigator so that the investigator computer 10 can use its private key to decrypt the file encryption key and read the media file.

A key server 20 can either add the public-key-encrypted file key of an authorized interested investigator to the media file in server 15 or it can provide to the investigator computer the decryption key for the media file of interest as is illustrated in FIG. 3. The key server 20 can thus have control over encryption keys for the media and any other encrypted metadata in server 15. Server 15 can be configured to keep the original source version of the encrypted media unchanged, with any editing, commenting or addition to media files being provided as additional layers or as additional versions. In this way, the chain of custody for encrypted electronic evidence can be established with fewer parties being involved since the editable source media file was not subject to access between device 50 and storage 15.

The key server 20 can be a separate entity from the evidence storage server 15. For example, it can be an independently controlled server that assures that only authorized personnel can access the encrypted data files and that can attest for court purposes to that effect. The key server 20 can also maintain a log or audit trail of those personnel that were given access to the files in the server 15. The files in server 15 can be stored with the original encryption key that is never shared with others for safe keeping of the original version with copies being re-encrypted with a new key determined by the key server 20, or alternatively a copy of the encrypted version can be sent to requesting parties while the original copy on server 15 remains protected.

Likewise, the key server 20 can be a function of the investigation computer 10. For example, the investigation computer can securely store its own private key and send its public key to the server 45 so that it can be used to encrypt the file encryption key. As already described, the public key encrypted file encryption key can be stored with the encrypted media data file on server 15. In this way, computer 10 can retrieve from server 15 the encrypted media data file from server 15, use its private key to decrypt the file encryption key and have access to the media data file.

Figure 5:
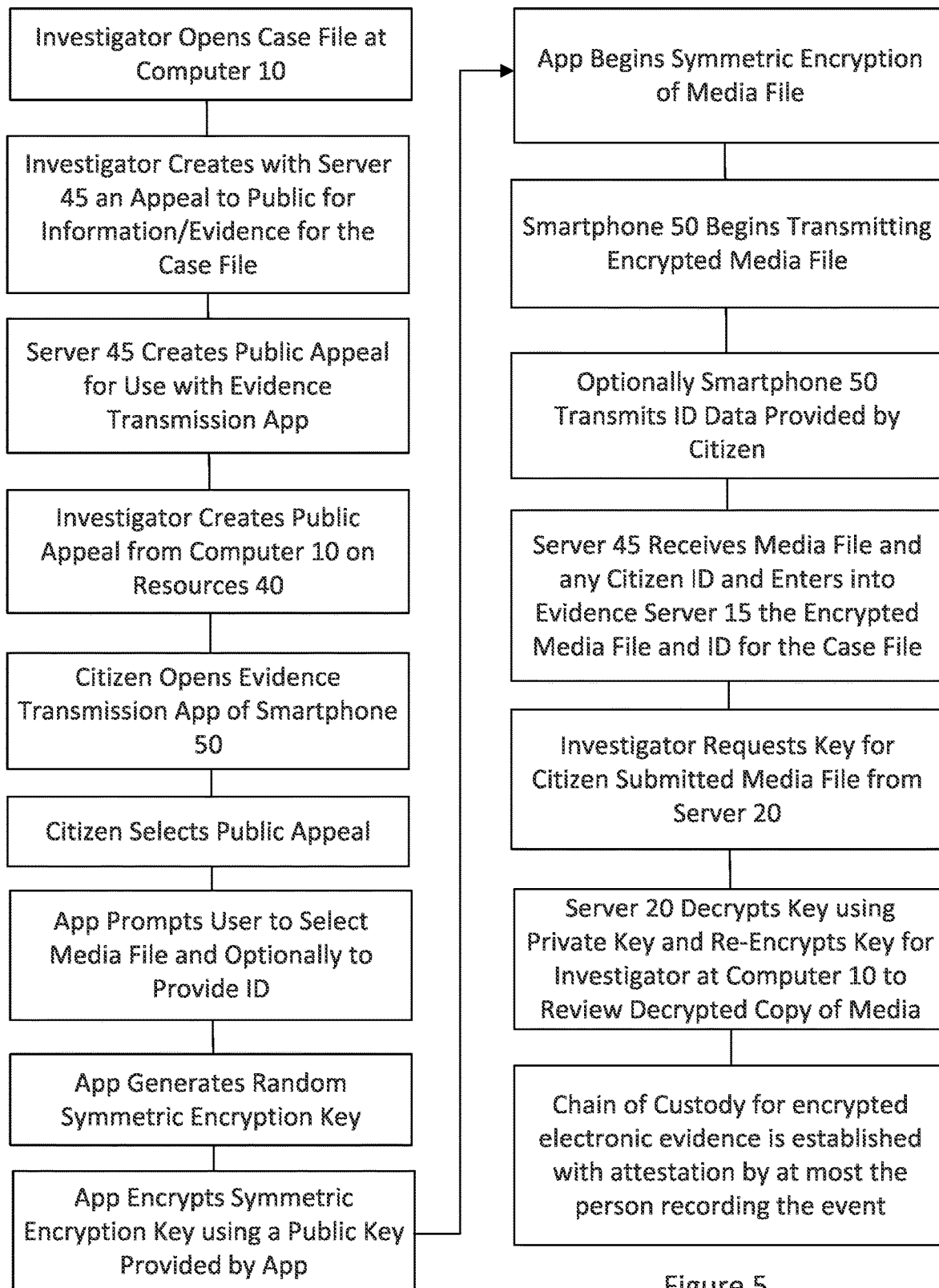
FIG. 5 is a flow diagram of steps involved in electronic evidence collection with reference to the system of FIG. 3.

FIG. 5 illustrates a flowchart of an electronic evidence collection and handling system similar to FIG. 4, except that the citizen computer 50 has an app instead of using its browser. As illustrated, the police investigator computer 10 creates an appeal to public for information and evidence (hereinafter, the "public appeal") on the server 45. The server 45 creates the public appeal for use with evidence transmission app. The investigator computer 10 creates the public appeal on the resources 40 (police public website, twitter, Facebook, etc.) and an evidence acceptance server using app for the public appeal. When a citizen opens the evidence transmission app of the smartphone 50 and goes to the app, the app prompts the user to select a media file and to optionally provide their ID or other information. The app then generates file encryption key and encrypts the file encryption key using a public key provided by the app. Subsequently, the app begins encryption of media file, for example using symmetric encryption. If a file is too large, it will be broken down into more manageable portions. The smartphone 50 then begins transmitting encrypted media file(s) and, optionally, the ID data provided by the citizen. Next, the server 45 receives media file and any citizen ID and enters into the evidence server 15 the encrypted media file and the ID for the case file. When an investigator requests key for citizen submitted media file from the server 20, the access control server 20 decrypts key using the private key and re-encrypts key for investigator at the computer 10 to review decrypted copy of media. This way the chain of custody for encrypted electronic evidence is established with attestation by at most the person recording the event.

The investigator computer can also comprise a QR code generator to create a QR code (or any optically readable code able to encode the URL and be read by a smartphone) for inclusion in the social media or e-mail broadcast system 40 or alternatively transmitted to police officers. In this way, the URL can be more conveniently shared from one handheld device to another. For example, officers at the scene of a crime can access the QR code and show it to witnesses who can use their smartphones to connect to the URL of a quickly set-up public appeal site 45 for the crime event.

Furthermore, a 911 call center computer or an electronic evidence admission computer for police officers may contact the evidence storage server 15 internally and submit evidence similarly. It will be appreciated that a version of server 45 for use within a law enforcement agency can also be used for such internal computers submitting evidence to server 15. As described herein, a browser as is available on a computer workstation can be used to encrypt media files from such internal computers for storage in server 15.

Figure 6:
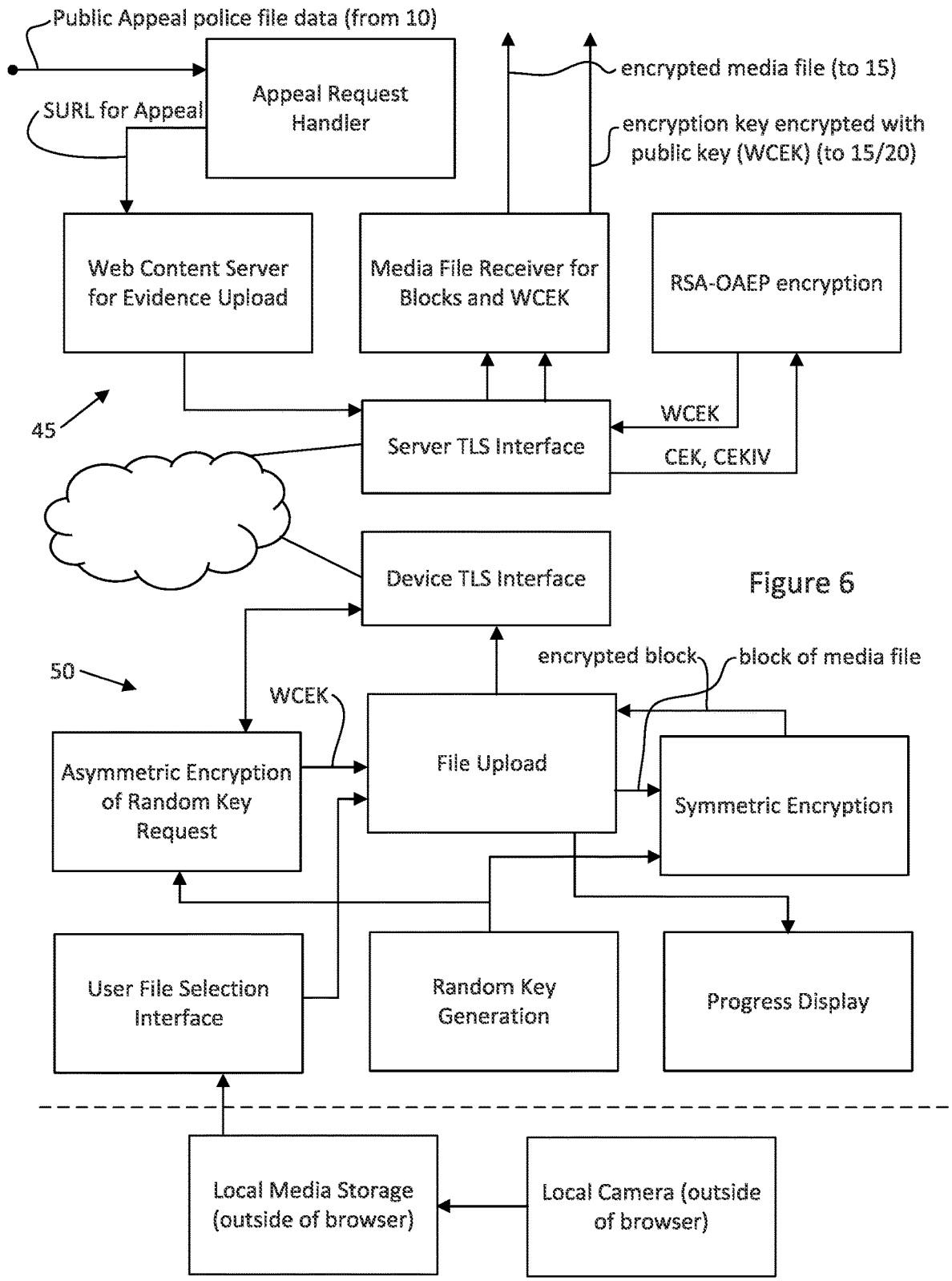
FIG. 6 is a schematic block diagram illustrating details of the evidence acceptance server and of the citizen computer or smartphone having a browser that form part of the system of FIG. 3 according to an embodiment.

With reference to FIG. 6, the browser-based upload/encryption will be described. Computer 50 having a browser can be used to upload to the digital evidence management system (i.e. servers 45, 15 and optionally 20) a file that is encrypted in a client browser. A browser can have limited ability to perform certain computations as a result of browser restrictions for security purposes. However, many browsers have the ability to perform encryption in addition to be permitted to upload a file from the computer.

The encryption and upload process can use two different threads of execution to avoid affecting a user interface rendering, for example, a progress display, during a large file upload. The first thread can be the main user interface or UI thread that will initiate the whole process and display progress. The second thread can be in a web worker and communication with a protocol like RPC with the main UI thread. When sending information to the server 45, there is no need to assume any stateful communication or communication to a single server. The below presented algorithm is given as an example and is aimed for a microservice environment. This implementation considers the difficulty of doing RSA OAEP in browser and is offloading this process to the server side. An implementation without a browser can execute the RSA OAEP in process more easily.

Content of pseudocode for browser implementation:
Procedure MainThreadUploadFile(fileStream, destination)
    Create the WebWorker thread.
    Send a message to the WebWorker to initiate a file upload.
End Procedure
Procedure MainThreadDisplayProgress
    Display a progression in the UI for the file encryption and upload process.
End Procedure
Procedure MainThreadDisplayComplete
    Display a completion message in the UI for the file encryption and upload process.
    Destroy the WebWorker thread.
End Procedure
Procedure WebWorkerThreadUploadFile(fileStream, destination)
    Set CEK as a new random symmetrical key of 256 bits for the content encryption key.
    Set CEKIV as a new initialization vector of 128 bits.
    Send a REST message to server to initiate the creation of a file on the server.
    Set BlockSize to 4194304 which is 4 mb minus AES padding.
    Foreach Block of BlockSize in filestream then
        Set encryptedData to the result of WebWorkerThreadEncryptBlock(block, CEK, CEKIV)
        Send encryptedData to server.
        Send an RPC message to the main UI thread to MainThreadDisplayProgress( . . . )
    End foreach
    Send a message to server that we completed all block.
    Send a REST message to server to WRAP the CEK and CEKIV using the RSA-OAEP encryption with PublicKeyOfServer20.
    Set WCEK as the return from the last server request.
Destroy the CEK and CEKIV from memory.
    Send a REST message to server to store the WCEK.
    Destroy the WCEK from memory.
    Send a REST message to server to indicate the file is completed.
    Send an RPC message to the main UI thread to MainThreadDisplayComplete( . . . ) End Procedure Procedure WebWorkerThreadEncryptBlock(block, CEK, CEKIV)
    Encrypt block using AES256 with PKCS7 padding in CBC mode.
    Return the encrypted block.
End Procedure As is known in the art, the progress display can show, for example, a percentage of the media file uploaded. It will be appreciated that the above approach has the progress display run as a separate thread from the file upload, and that the progress display can continue to run while encryption and file upload data communications are in progress. This avoids the appearance of the browser "hanging", that in turn could cause the user to abort the media upload process.

As shown in FIG. 6, the server 45 has an appeal request handler that interfaces with computer 10 (and any other computer of law enforcement agents) as illustrated in FIG. 3. The SURL that was communicated to computer 10 is also recorded within a web server that will response to an http request for the SURL to establish a TLS connection between server 45 and client 50 and provide the web content to client 50. As set out above in the pseudocode, the browser implements a file upload thread and a progress display thread. Also, a file encryption key is randomly generated by the browser and used for encrypting each block. The encrypted blocks are uploaded too the media file receiver of server 45. The file encryption key is sent over the TLS connection to an RSA-OAEP encryption engine at server 45 so that it encrypts the file encryption key using, for example, the public key of server 20. While the encrypted key could be then sent directly to server 20 or server 15 from server 45, in the embodiment illustrated in FIG. 6 it is returned to the browser for transmission to the media file receiver.

The user file selection interface can include, as described above, an interface to allow the user to provide personal identification and optionally any further details relevant to the appeal, such as eye-witness account information.

The public evidence collection server 45 can include a processor, network communications interface and memory readable by the processor. The memory can store computer program code that when executed by the processor performs the operations as described above. For example, this can include handling a request from a law enforcement computer 10 to create a public evidence collection request using an identification of an investigation and to create a profile for the investigation. This can also include establishing a connection with a source computing device 50 of a member of the public. This can also include receiving an encrypted evidence data file from the source computing device 50. This also can involve linking the encrypted evidence data file with the profile for the investigation using data received from the source computing device 50. This can also involve storing the encrypted evidence data file in the evidence data storage 15.

A screen image of a user interface appearing in the browser of computer 50 is illustrated in FIG. 7A. As shown, there is a display of the public appeal identification, a file upload selector, a map of the location of the area of interest to the investigation, a comment text box and a citizen identification text box. The police investigator using computer 10 can specify one or more locations associated with an incident so that the citizen using the computer 50 can understand and consider the location more easily. While the interface shown in FIG. 7A has a simple text box for the citizen to provide information, a questionnaire can be provided. This questionnaire can be a fixed template or it can be adjusted or selected by the police investigator using computer 10. In the case of the browser implementation, the selection concerning the questionnaire changes the content of the web content served to computer 50 by server 45, and in the case of the app implementation, the selection can change the settings associated with the public appeal in server 45 so that the app displays the appropriate questionnaire.

Figure 7B:
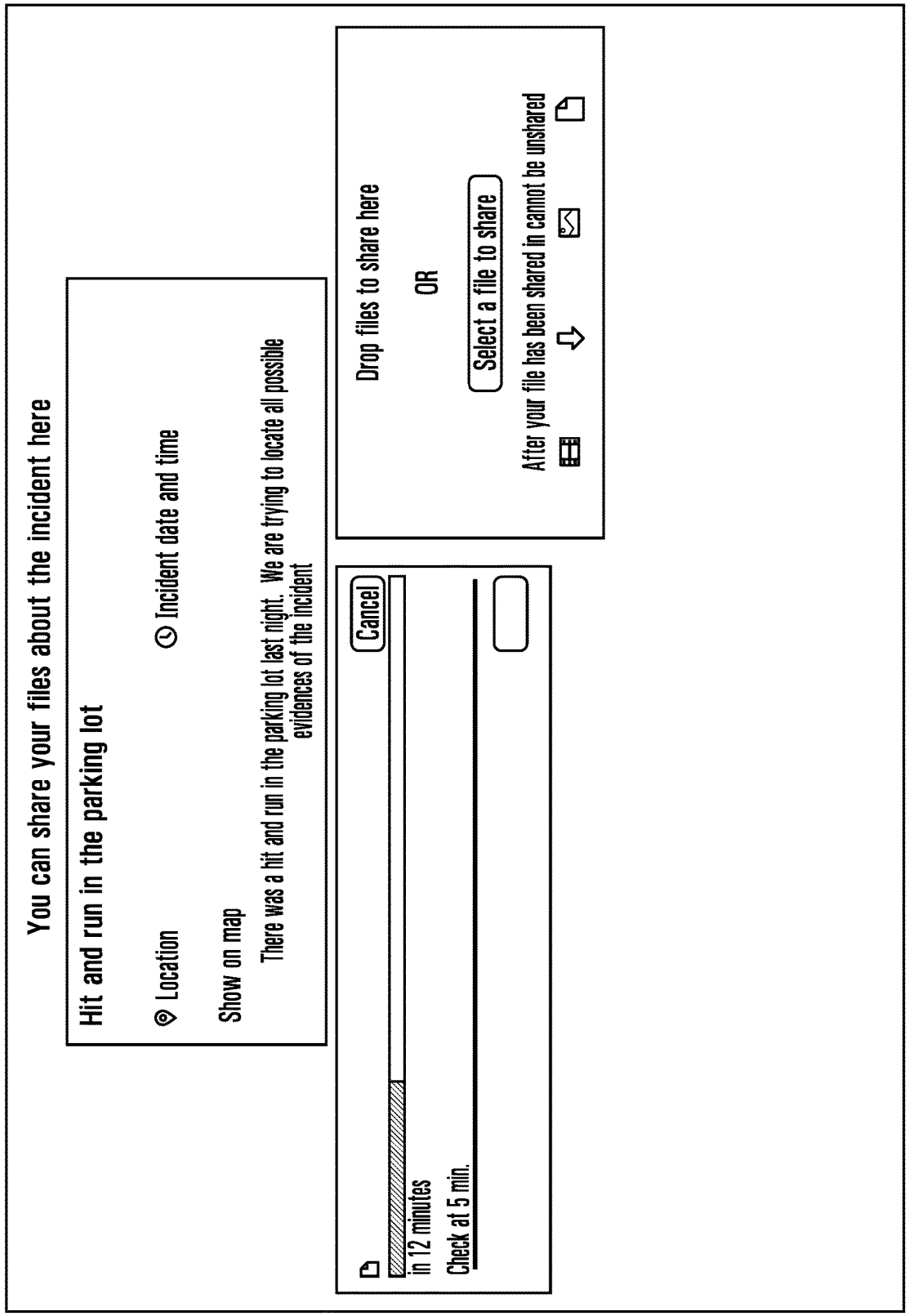
FIG. 7B is a screen image of a user interface provided in a browser showing file transfer progress display appears when a media file is being uploaded.

As shown in FIG. 7B, a file transfer progress display appears when a media file is being uploaded.

It will be appreciated that the methods and systems described herein can allow investigators to quickly canvass the public for information and evidence related to an investigation and to have the response from the public returned to investigators quickly for review. This can lead to faster solving of investigations. When the citizen provides evidence media files, encrypting such files at their source can simplify the chain of custody of the evidence and thus make such evidence easier to use in court and more reliable to be used by investigators. This can lead to greater efficiency in prosecution of criminals.

What is claimed is:

1. A public evidence collection server comprising a processor, network communications interface and memory readable by said processor, said memory storing computer program code that when executed by said processor performs:
   handling a request from a first computer to create a public appeal for an investigation, said public appeal associated with a public appeal webpage that is accessible by a uniform resource locator (URL) for members of the public to submit evidence pertaining to the investigation via the public appeal webpage;
   establishing a connection with a source computing device of a member of the public when a browser of the source computing device accesses the URL of the public appeal webpage, including obtaining an identification of the public appeal from the source computing device;
   receiving an encrypted evidence data file from the browser of said source computing device;
   linking said encrypted evidence data file with said public appeal for said investigation using the identification of the public appeal obtained from said source computing device; and
   storing said encrypted evidence data file in an evidence data storage.

2. The public evidence collection server as claimed in claim 1, said memory further storing computer program code that when executed by said processor performs:
   sending an encrypted copy of a file encryption key to a key server associated with said evidence data storage, the file encryption key used by said source computing device to encrypt a source evidence data file to generate said encrypted evidence data file.

3. The public evidence collection server as claimed in claim 1, said memory further storing computer program code that when executed by said processor performs:
   sending said URL to solicit public evidence from said member of the public, said member of the public providing said URL to said browser, and said browser connecting to said URL to obtain web content that provides browser instructions for collecting the public evidence.

4. The public evidence collection server as claimed in claim 3, wherein sending said URL comprises sending said URL to said source computing device.

5. The public evidence collection server as claimed in claim 3, wherein sending said URL comprises sending said URL to said first computer to issue a public communication comprising the URL.

6. The public evidence collection server as claimed in claim 3, wherein the web content that provides browser instructions comprises instructions to perform at least:
   generating in said source computing device a file encryption key and encrypting by said source computing device a source evidence data file with said file encryption key to generate said encrypted evidence data file;
   transmitting to said public evidence collection server said encrypted evidence data file from the browser of the source computing device;
   transmitting to said public evidence collection server or to a chain-of-custody server said file encryption key for providing access to said source evidence data file.

7. The public evidence collection server as claimed in claim 6, wherein the file encryption key is a symmetric encryption key, wherein the web content that provides browser instructions comprises further instructions to perform at least: using a public encryption key to asymmetrically encrypt said file encryption key to generate an encrypted copy of said file encryption key; and wherein transmitting said file encryption key corresponds to transmitting said encrypted copy of said file encryption key.

8. The public evidence collection server as claimed in claim 1, wherein creating the public appeal comprises creating said public appeals webpage and said URL for said public appeals webpage.

9. The public evidence collection server as claimed in claim 1, wherein creating the public appeal comprises configuring said public appeal webpage for the member of the public to identify the public appeal in said public appeal webpage for submitting evidence pertaining to said public appeal for said investigation.

10. The public evidence collection server as claimed in claim 1, wherein said public appeal webpage has a plurality of public appeals each corresponding to a respective investigation, and said obtaining the identification of the public appeal from the source computing device comprises obtaining a selection of the public appeal from the member of the public made via the browser of the source computing device.

11. The public evidence collection server as claimed in claim 1, wherein said public appeal webpage comprises a plurality of public appeal webpages each corresponding to a respective investigation, and obtaining the identification of the public appeal from the source computing device comprises obtaining the identification based on a secure URL associated with the public appeal accessed by the member of the public via the browser of the source computing device.

12. A method for collecting electronic evidence by a public evidence collection server, the method comprising:
   handling a request from a first computer to create a public appeal for an investigation, said public appeal associated with a public appeal webpage that is accessible by a uniform resource locator (URL) for members of the public to submit evidence pertaining to the investigation via the public appeal webpage;
   establishing a connection with a source computing device of a member of the public when a browser of the source computing device accesses the URL of the public appeal webpage, including obtaining an identification of the public appeal from the source computing device;
   receiving an encrypted evidence data file from the browser of said source computing device;
   linking said encrypted evidence data file with said public appeal for said investigation using the identification of the public appeal obtained from said source computing device; and storing said encrypted evidence data file in an evidence data storage.

13. The method as claimed in claim 12, further comprising:
sending an encrypted copy of a file encryption key to a key server associated with said evidence data storage, the file encryption key used by said source computing device to encrypt a source evidence data file to generate said encrypted evidence data file.

14. The method as claimed in claim 12, further comprising:
sending said URL to solicit public evidence from said member of the public, said member of the public providing said URL to said browser, and said browser connecting to said URL to obtain web content that provides browser instructions for collecting the public evidence.

15. The method as claimed in claim 14, wherein sending said URL comprises sending said URL to said source computing device.

16. The method as claimed in claim 14, wherein sending said URL comprises sending said URL to said first computer to issue a public communication comprising the URL.

17. The method as claimed in claim 14, wherein the web content that provides browser instructions comprises instructions to perform at least:
generating in said source computing device a file encryption key and encrypting by said source computing device a source evidence data file with said file encryption key to generate said encrypted evidence data file;
transmitting to said public evidence collection server said encrypted evidence data file from the browser of the source computing device;
transmitting to said public evidence collection server or to a chain-of-custody server said file encryption key for providing access to said source evidence data file.

18. The method as claimed in claim 17, wherein the file encryption key is a symmetric encryption key, wherein the web content that provides browser instructions comprises further instructions to perform at least: using a public encryption key to asymmetrically encrypt said file encryption key to generate an encrypted copy of said file encryption key; and wherein transmitting said file encryption key corresponds to transmitting said encrypted copy of said file encryption key.

19. The method as claimed in claim 12, wherein creating the public appeal comprises creating said public appeals webpage and said URL for said public appeals webpage.

20. The method as claimed in claim 12, wherein creating the public appeal comprises configuring said public appeal webpage for the member of the public to identify the public appeal in said public appeal webpage for submitting evidence pertaining to said public appeal for said investigation.

21. The method as claimed in claim 12, wherein said public appeal webpage has a plurality of public appeals each corresponding to a respective investigation, and said obtaining the identification of the public appeal from the source computing device comprises obtaining a selection of the public appeal from the member of the public made via the browser of the source computing device.

22. The method as claimed in claim 12, wherein said public appeal webpage comprises a plurality of public appeal webpages each corresponding to a respective investigation, and obtaining the identification of the public appeal from the source computing device comprises obtaining the identification based on a secure URL associated with the public appeal accessed by the member of the public via the browser of the source computing device.

23. A non-transitory computer readable memory storing instructions for a computer processor that when executed perform:
handling a request from a first computer to create a public appeal for an investigation, said public appeal associated with a public appeal webpage that is accessible by a uniform resource locator (URL) for members of the public to submit evidence pertaining to the investigation via the public appeal webpage;
establishing a connection with a source computing device of a member of the public when a browser of the source computing device accesses the URL of the public appeal webpage, including obtaining an identification of the public appeal from the source computing device;
receiving an encrypted evidence data file from the browser of said source computing device;
linking said encrypted evidence data file with said public appeal for said investigation using the identification of the public appeal obtained from said source computing device; and
storing said encrypted evidence data file in an evidence data storage.

* * * * *